Dec. 11, 1945.    J. M. MARKEL    2,390,954
HARROW
Filed May 5, 1943    2 Sheets-Sheet 1

INVENTOR
John M. Markel
BY
Emerson B. Donnell

Dec. 11, 1945.  J. M. MARKEL  2,390,954
HARROW
Filed May 5, 1943  2 Sheets-Sheet 2
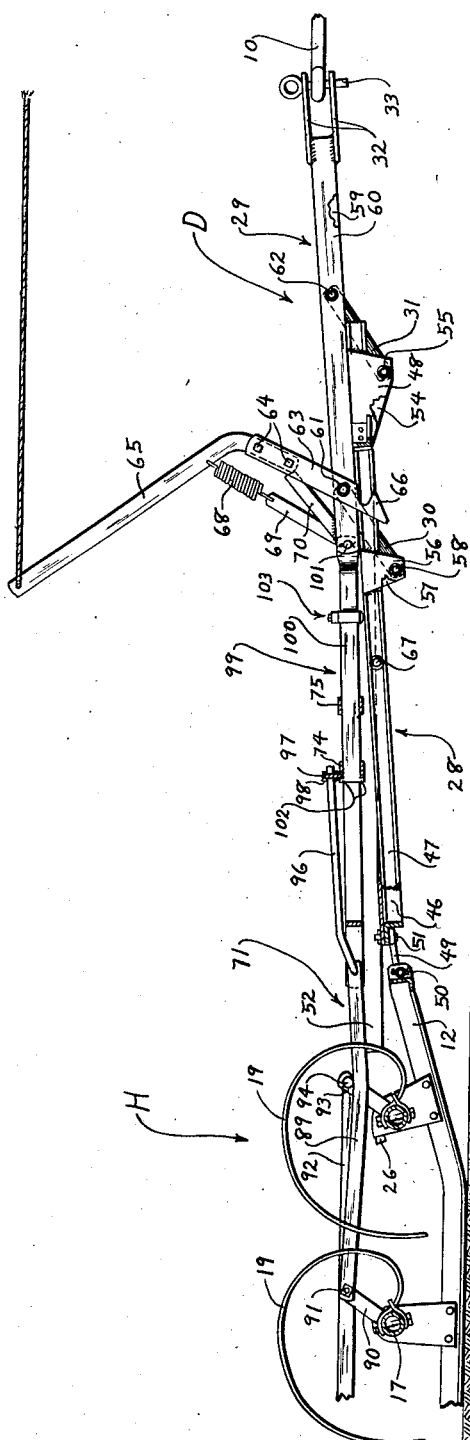
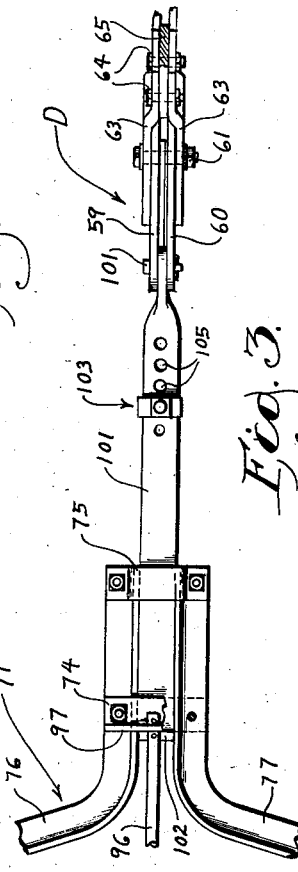
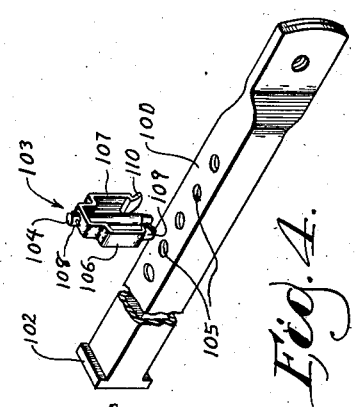
INVENTOR
John M Markel
BY
Emerson B Donnell Patented Dec. 11, 1945

2,390,954

UNITED STATES PATENT OFFICE 2,390,954

HARROW

John M. Markel, Rockford, Ill., assignor to J. I. Case Company, Racine, Wis., a corporation Application May 5, 1943, Serial No. 485,752

13 Claims. (Cl. 55—104)

The present invention relates to harrows or similar agricultural implements and an object of the invention is to generally improve the construction and operation of devices of this class. More particularly the invention relates to the means for controlling the harrow by means of power and which will be reliable and relatively free from friction under the severe conditions of operation to which this class of apparatus is subjected.

A further object is to provide an improved power control for a spring tooth harrow. Further objects and advantages will become apparent from the following specification and accompanying drawings wherein a satisfactory embodiment of the invention is shown. However, it is to be understood that the invention is not limited to the details disclosed but includes all such variations and modifications as fall within the spirit of the invention as herein expressed.

In the drawings Figure 1 is a perspective view of the portions of a spring tooth harrow which embody the invention, taken from a point above and to the right, parts being broken away.

Fig. 2 is a right side elevation of the same with certain of the parts in a different position.

Fig. 3 is a plan view of certain mechanism indicated in Figs. 1 and 2.

Fig. 4 is an "exploded" view of a draw bar portion and associated detent or stop element.

Figure 1:
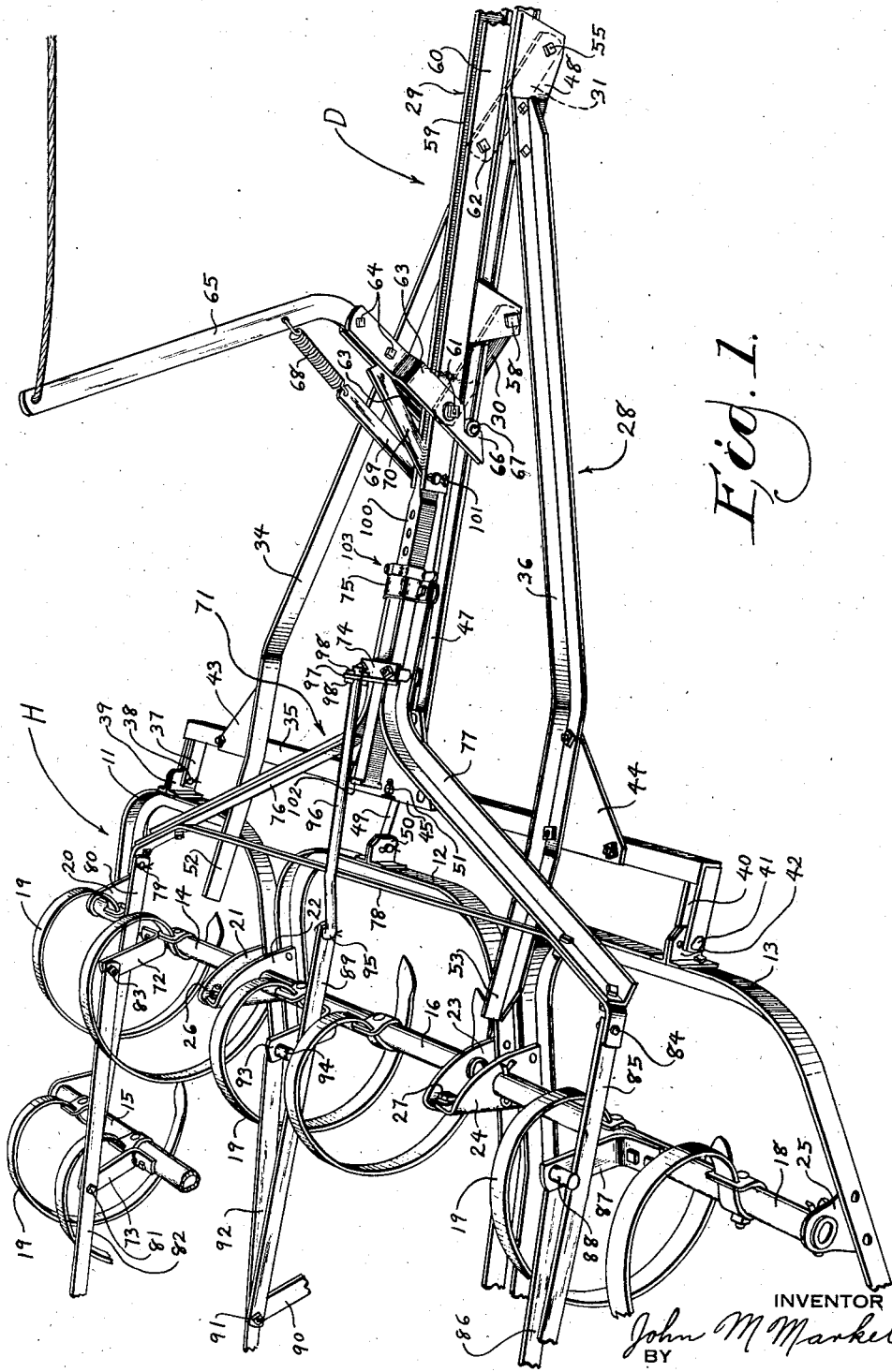

As seen in Fig. 1, the implement comprises in general a draw bar D which is attached to and which propels a harrow portion generally designated as H. Draw bar D as seen in Fig. 2 connects with a tractor draw bar 10 through which the complete unit is propelled, draw bar D transmitting the draft of the tractor to harrow H which may be varied in form to some extent within the contemplation of the invention, the illustrated embodiment including a plurality of runner frames 11, 12 and 13. Each of these runner frames supports a plurality of cross pipes as 14 and 15 associated with runner frame 11, it being understood that runner frames 12 and 13 are substantially identical with runner frame 11. Thus runner frame 12 supports cross pipes 16 and 17 (Fig. 2) while runner frame 13, substantially identical with runner frame 11, supports a cross pipe 18 and a cross pipe not shown corresponding to cross pipe 15.

If desired, each of these runner frames may support a third cross pipe not shown, in a manner which is well-known in the art and not necessary to further illustrate. Cross pipes 14 to 18 inclusive all support in the present instance spring harrow teeth of suitable or well-known type 19—19 which engage the ground in well-known manner as runner frames 11, 12 and 13 are propelled by tractor draw bar 10 and draw bar D. Cross pipe 14 is journaled at one end in a bearing 20 supported on runner frame 11 and at the other end in a bearing 21 also supported on runner frame 11. In similar manner, cross pipe 16 is journaled in bearings 22 and 23 carried on runner frame 12 while cross pipe 18 is journaled in bearings 24 and 25 mounted on runner frame 13 in well-known manner. Bearings 21 and 22 are united by a longitudinal pivot bolt 26 while bearings 23 and 24 are united by a pivot bolt 27. These pivot bolt constructions being well-known, need not be further described except to state that similar constructions rearwardly spaced from bearings 21 and 23 respectively, unite runner frames 11, 12 and 13 at points spaced rearwardly. Thus the runner frames are flexibly supported so that spring teeth 19 may engage the ground at substantially corresponding depths from side to side of the harrow regardless of normal inequalities of the ground surface, in well-known manner.

Runner frames 11, 12 and 13 are connected with what may be termed a stationary portion of draw bar D generally designated as 28 to which is connected a relatively movable portion generally designated as 29. Returning to Fig. 2, stationary portion 28 is connected with movable portion 29 by links 30 and 31, portion 29 being bifurcated at 32 to engage tractor draw bar 10 and a suitable pin 33, connecting the two in well-known manner. It will thus be apparent that any propelling force exerted by tractor draw bar 10 will first move movable portion 29, swinging links 30 and 31. At the limit of permissible movement of links 30 and 31, portion 29 will commence to move portion 28, whereupon propelling force will be exerted through portion 28 on runner frames 11, 12 and 13. This initial relative movement is utilized as will appear to control the position of the several cross pipes 14 to 18 etc., and the attached harrow teeth.

Portion 28 is generally in the form of an A frame including a diagonal member 34, Fig. 1, a cross member 35 and a second diagonal member 36. Members 34 and 36 are united by cross member 35 which is connected with runner frame 11 through a rearwardly extending bifurcated arm 37. Arm 37 is pivoted in the present instance by a pin 38 to an ear 39 fixed on the front of runner frame 11. In similar manner a bifurcated arm 40 extends from cross member 35 to a pivot connection 41 to an ear 42 fixed on the front of runner frame 13.

For strengthening and stiffening the structure, bracing or gusset plates 43 and 44 are interposed between members 34 and 35, and members 36 and 35. Another plate 45 connects with cross member 35 and with spaced forwardly extending channel members 46 and 47 as best seen in Fig. 2. Members 46 and 47 extend forwardly and are joined respectively with members 34 and 36 by fittings as 48. A strong and rigid frame is thereby provided for pulling the several runner frames. Runner frame 12 is connected with plate 45 by a link 49 pivotally engaged with an ear 50 on runner frame 12 and also with a pin 51 journaled in plate 45. It will now be apparent that the rear end of stationary draw bar portion 28 is supported from outer runner frames 11 and 13 while inner runner frame 12 is free to find its own position relatively to cross member 35.

Portions 34 and 36 have rearward extensions 52 and 53 respectively, for a purpose which will appear. A companion fitting 54, Fig. 2, is spaced from above mentioned fitting 48 by a pivot bolt 55 on the other side of channel member 46, link 31 being pivoted at its lower end on pivot 55. In similar manner fittings 56 and 57 are spaced from each other by pivot bolts 58 on which is journaled above mentioned link 30, fittings 48, 54, 56 and 57 accordingly provide the means of connection between movable portion 29 and stationary portion 28 of draw bar D. Links 30 and 31 extend generally upwardly between spaced apart bars 59 and 60 constituting the major part of movable portion 29 and are pivoted thereto on pivot bolts 61 and 62 respectively. The several pivots are so chosen that links 30 and 31 remain substantially parallel during the relative movements of draw bar portions 28 and 29. Thus a very free movement of movable portion 29 is provided, characterized by a lack of sliding connections which, under the weight imposed upon the draw bar and the accumulation of dust and the like inevitably present might strongly resist movement and render the power control inoperative. Bars 59 and 60 may be properly spaced by pivot bolts 61 and 62 and also by above mentioned bifurcated portion 32 to form a rugged movable member.

Movable portion 29 has two normal positions, one a rearward position, as seen in Fig. 1, and the other a forward position as seen in Fig. 2, the forward position determining the transport position of the implement and the rearward position determining the working position of harrow teeth 19. Portion 29 is maintained in working position by a latch 63—63 pivoted on above mentioned pivot bolt 61 and united as by bolts 64—64 with a lever 65. Latch members 63—63 include lip members as 66 engageable with a pin member 67 fixed to channel members 46 and 47 transversely thereof. Lever 65 is urged rearwardly by a spring 68 anchored on a link 69 connected in any suitable manner with bar member 59. A stop 70 in the present instance fixed with bar member 60 engages lever 65 and limits rearward movement thereof. It will now be apparent that mechanism has been provided for obtaining and controlling the forward and rearward movement of movable portion 29.

This movement is transmitted to and causes rocking motion of pipes 14 to 18, etc., to control teeth 19—19 toward and from working position. For this purpose a lifting frame or connection generally designated as 71, slidable upon above mentioned rearward extensions 52 and 53 connects between movable portion 29 and pipes 14 to 18, etc., as follows. Pipe 14 has an upwardly extending actuating arm 72 and pipe 15 has a similar arm 73, it being understood that each of the several cross pipes has a similar or equivalent upwardly extending arm. Frame 71 includes spaced yokes 74 and 75 uniting diagonal frame members 76 and 77 which are connected at their outer ends by a cross brace 78. Member 76, or more properly the end portion of brace 78 connected with member 76, connects as by a pivot 79 with a rearwardly extending connecting link 80 which extends rearwardly past arm 72 and connects with arm 73 by pivot 81. Pivot 81 also connects a link 82 with arm 73, link 82 extending forwardly to above mentioned arm 72 and being connected therewith by a pivot 83. Link 82 also extends rearwardly to the counterpart of arm 73 on a cross pipe spaced rearwardly from pipe 15 in well-known manner not shown. It will be apparent that forward and rearward movement of frame 72 through links 80 and 83 will cause rocking movement of the several cross pipes and their connected harrow teeth. A similar construction is used in connection with member 77, the latter being pivoted as by a bolt 84 to a link 85 which connects with the several rearwardly spaced cross pipes and a link 86 in the manner just described in connection with member 76. Link 86 connects with an arm 87, similar to above mentioned arm 72, by means of a pivot 88. Pivot 88 includes an elongated head portion spaced above link 85 so that it may swing forwardly and rearwardly thereover. However, upon extreme movement in either direction, head portion 88 will contact the top of link 85 and prevent further rocking of lever 87. Identical construction is used in the present instance in connection with arm 72.

In the case of cross pipe 16, a similar construction is used, a link 89 extending rearwardly to an arm 90 (see also Fig. 2) to which it is connected by a pivot 91, a link 92 extending rearwardly and forwardly to actuate companion arms as in the case of link 82. An arm 93 is connected with link 92 by a pivot 94 including an enlarged head for contacting with link 89 as above described in connection with link 85. Link 89 is pivotally connected at 95 with a pull rod 96 which is connected for limited freedom with a flange 97, in the present instance constituting a part of yoke 74, as by cotter pins 98—98. Thus, fore-and-aft movement of frame 71 including yoke 74 causes corresponding movement of rod 96 and links 89 and 92. Frame 71 and particularly yoke 74 therefore constitutes a common terminal for the several links so that they may be actuated simultaneously, as will appear. It will now be apparent that the cross pipes in the several frames 11, 12 and 13 can be given rocking movement by fore-and-aft movement of above mentioned frame 71 while the several runner frames are free for limited independent movement in accordance with variations in ground surfaces over which the implement travels.

A lost motion connection generally designated as 99 is established between movable portion 29 of draw bar D and frame 71, or common terminal 74, in the present instance a square pipe 100 being flattened or suitably shaped and connected by a pivot 101 with the rear ends of bars 59 and 60. Pipe 100 passes through yokes 74 and 75 so as to be guided for sliding movement in the direction of frame 71. At the rear end, pipe 100 has a stop or shoulder 102 which prevents forward movement of pipe 100 beyond the point of contact of shoulder 102 with yoke 74 without corresponding movement of frame 71. The dimensions of the parts are so chosen that complete forward motion of movable portion 29 will pull frame 71 forwardly substantially to the point where stops 88, 94, etc., limit further forward rocking movement of the several cross pipes. Thus such forward movement will place teeth 19 into transport position.

Upon initial rearward movement of movable portion 29, pipe 100 slides freely through yokes 74 and 75 without movement of frame 71 until an adjustable stop 103 contacts above mentioned yoke 75. Further rearward movement of member 29 into the latched position shown in Fig. 1 forces teeth 19 into working position at a greater or less depth according to the adjustment of stop 103.

Stop 103 as more particularly shown in Fig. 4, in the present instance comprises a pin 104 engageable in one or another of holes 105—105 in pipe 100. A spring clip including fingers 106 and 107 is connected to pin 104 as by a cotter pin 108 or other suitable connection. Upon insertion of pin 104 in the desired opening in pipe 100, fingers 106 and 107 embrace pipe 100 and have portions 109 and 110 which contract beneath the pipe and prevent inadvertent removal of pin 103.

The operation of the implement is thought to be clear from the above description, forward movement of portion 29 causing lifting of teeth 19 to transport position if latch 63—64 is disengaged from pin 67.

The above being a complete description of an illustrative embodiment of the invention, what is claimed as new and desired to be secured by Letters Patent of the United States is:

1. In a harrow a runner frame, a plurality of cross pipes, rockably supported on the frame, spring teeth fixed with the cross pipes so as to be lifted relatively to the runner frame by rocking of the cross pipes, actuating arms on the cross pipes, a lifting connection to the actuating arms, a drawbar having a portion connected with said runner frame and a relatively movable portion, said lifting connection being connected at one end to said movable portion, swinging links connecting the first and second mentioned portions of said draw bar, a latch on one portion of the draw bar and disposed to engage the other portion upon extreme rearward movement of said movable portion, a stop on said movable portion engaging said lifting connection upon forward movement of said movable portion to actuate said lifting connection to rock said cross pipes to move said harrow teeth to transport position, and a second stop on said movable portion, spaced from the first mentioned stop and adjustable in position to engage said lifting connection upon rearward movement of said movable draw bar portion to force said teeth into working position, more or less according to the position of said adjustable stop.

2. In a harrow a runner frame, a plurality of cross pipes, rockably supported on the frame, spring teeth fixed with the cross pipes so as to be lifted relatively to the runner frame by rocking of the cross pipes, actuating arms on the cross pipes, lifting connections to the actuating arms converging to a common terminal, a drawbar having a portion connected with said runner frame and a relatively movable portion, said common terminal being connected to said movable portion, swinging links connecting the first and second mentioned portions of said draw bar, a latch on the movable portion and disposed to engage the other portion upon extreme rearward movement of said movable portion, a stop on said movable portion engaging said common terminal portion upon forward movement of said movable portion to actuate said lifting connections to rock said cross pipes to move said harrow teeth to transport position, and a second stop on said movable portion, spaced from the first mentioned stop and adjustable in position to engage said common terminal portion upon rearward movement of said movable draw bar portion to force said teeth into working position, more or less according to the position of said adjustable stop.

3. In a harrow a runner frame, a plurality of cross pipes, rockably supported on the frame, spring teeth fixed with the cross pipes so as to be lifted relatively to the runner frame by rocking of the cross pipes, actuating arms on the cross pipes, lifting connections to the actuating arms, a drawbar having a portion connected with said runner frame and a relatively movable portion, said lifting connections being connected at one end to said movable portion, swinging links connecting the first and second mentioned portions of said draw bar, a latch on the movable portion and disposed to engage the other portion upon extreme rearward movement of said movable portion, said movable portion having a stop positioned for engaging said lifting connections upon forward movement of said movable portion to rock said cross pipes to move said harrow teeth to transport position.

4. In a harrow a runner frame, a plurality of cross pipes, rockably supported on the frame, spring teeth fixed with the cross pipes so as to be lifted relatively to the runner frame by rocking of the cross pipes, actuating arms on the cross pipes, lifting connections to the actuating arms converging to a common terminal, a drawbar having a portion connected with said runner frame and a relatively movable portion, said common terminal being connected to said movable portion, swinging links connecting the first and second mentioned portions of said draw bar, a pin on the first mentioned portion of said draw bar, a latch on the movable portion and disposed to engage the pin upon extreme rearward movement of said movable portion, a stop on said movable portion engaging said common terminal upon forward movement of said movable portion to actuate said lifting connections to rock said cross pipes to move said harrow teeth to transport position, and a second stop on said movable portion, spaced from the first mentioned stop and adjustable in position to engage said common terminal portion upon rearward movement of said movable draw bar portion to force said teeth into working position, more or less according to the position of said adjustable stop.

5. In a harrow a ground engaging portion, a plurality of spring teeth carried by said ground engaging portion, lifting connections to the spring teeth for raising them relatively to said ground engaging portion, a draw bar having a relatively stationary portion and a relatively movable portion, said lifting connection being connected at one end to said movable portion, swinging links connecting the first and second mentioned portions of said draw bar, a latch on one portion and disposed to engage the other portion upon extreme rearward movement of said movable portion, said movable portion having a stop positioned for engaging said lifting connections upon forward movement of said movable portion to move said harrow teeth, relatively to said ground engaging portion, into transport position.

6. In a harrow a ground engaging portion, a plurality of harrow teeth carried by said ground engaging portion, lifting connections to the harrow teeth for raising them relatively to said ground engaging portion, a draw bar having a relatively stationary portion and a relatively movable portion, said lifting connection being connected at one end to said movable portion, swinging links connecting the first and second mentioned portions of said draw bar, a pin on the first mentioned portion of said draw bar, a latch lever on the movable portion and disposed to engage said pin upon extreme rearward movement of said movable portion, said movable portion having a stop positioned for engaging said lifting connections upon forward movement of said movable portion to move said harrow teeth, relatively to said ground engaging portion, into transport position.

7. In a harrow a ground engaging portion, a plurality of spring teeth carried by said ground engaging portion, lifting connections to the harrow teeth for raising them relatively to said ground engaging portion converging to a common terminal, a draw bar having a relatively stationary portion and a relatively movable portion, said common terminal being connected to said movable portion, swinging links connecting the first and second mentioned portions of said draw bar, a pin on the first mentioned portion of said draw bar, a latch lever on the movable portion and disposed to engage said pin upon extreme rearward movement of said movable portion, a stop on said movable portion engaging said common terminal portion upon forward movement of said movable portion to actuate said lifting connections to move said harrow teeth, relatively to said ground engaging portion, into transport position, and a second stop on said movable portion, spaced from the first mentioned stop and adjustable in position to engage said common terminal portion upon rearward movement of said movable draw bar portion to force said teeth into working position, more or less according to the position of said adjustable stop.

8. In a harrow a ground engaging portion, a plurality of spring teeth carried by said ground engaging portion, lifting connections to the spring teeth for raising them relatively to said ground engaging portion converging to a common terminal, a draw bar having a portion which is movable relatively to said ground engaging portion in a forward and backward direction, said common terminal being connected to said movable portion, a latch on the movable portion and disposed to prevent movement of said movable portion in said forward and backward direction, a stop on said movable portion engaging said common terminal portion upon forward movement of said movable portion to actuate said lifting connections to move said harrow teeth, relatively to said ground engaging portion, into transport position, and a second stop on said movable portion, spaced from the first mentioned stop and adjustable in position to engage said common terminal portion upon rearward movement of said movable draw bar portion to force said teeth into working position, more or less according to the position of said adjustable stop.

9. In a harrow a ground engaging portion, a plurality of spring teeth carried by said ground engaging portion, lifting connections to the spring teeth for raising them relatively to said ground engaging portion converging to a common terminal, a draw bar having a portion which is movable relatively to said ground engaging portion in a forward and backward direction, said common terminal being connected to said movable portion, a latch on the movable portion and disposed to prevent movement of said movable portion in said forward and backward direction, a stop on said movable portion engaging said common terminal portion upon forward movement of said movable portion to actuate said lifting connections to move said harrow teeth, relatively to said ground engaging portion, into transport position.

10. In a harrow a ground engaging portion, a plurality of spring teeth carried by said ground engaging portion, lifting connections to the spring teeth for raising them relatively to said ground engaging portion, a draw bar having a portion which is movable relatively to said ground engaging portion in a forward and backward direction, said lifting connections being connected at one end to the movable portion, a latch on the movable portion and disposed to prevent movement of said movable portion in said forward and backward direction, a stop on said movable portion engaging said lifting connections upon forward movement of said movable portion to actuate said lifting connections to move said harrow teeth, relatively to said ground engaging portion, into transport position, and a second stop on said movable portion, spaced from the first mentioned stop and adjustable in position to engage said lifting connections upon rearward movement of said movable draw bar portion to force said teeth into working position, more or less according to the position of said adjustable stop.

11. In a harrow a ground engaging portion, a plurality of spring teeth carried by said ground engaging portion, lifting connections to the spring teeth for raising them relatively to said ground engaging portion, a draw bar having a relatively stationary portion and a relatively movable portion, a latch on the movable portion engageable with the stationary portion and disposed to prevent movement of said movable portion after predetermined movement in one direction, said movable portion having a stop positioned for engaging said lifting connections upon forward movement of said movable portion to move said harrow teeth, relatively to said ground engaging portion, into transport position, and adjustable means for imparting desired amounts of movement in the other direction from said movable portion to said lifting connections.

12. In a harrow a ground engaging portion, a plurality of harrow teeth carried by said ground engaging portion, lifting connections to the teeth for raising them relatively to said ground engaging portion, a draw bar having a relatively stationary portion connected to said ground engaging portion and a portion movable a fixed amount relatively to said stationary portion, connections from said movable portion to said lifting connections for lifting the teeth relatively to said ground engaging portion by reason of movement of said relatively movable portion, and an adjustable lost motion connection between said movable portion and said lifting connections for adjusting the depth of penetration of said harrow teeth effected by movement of said movable portion.

13. In a harrow a ground engaging portion, a plurality of harrow teeth carried by said ground engaging portion, lifting connections to the teeth for raising them relatively to said ground engaging portion, a draw bar having a stationary portion connected to said ground engaging portion and a relatively movable portion, a lost motion connection between said movable portion and said lifting connections, and means for adjustably determining the movement imparted to said lifting connections by said lost motion connection to determine the depth of penetration of said harrow teeth.

JOHN M. MARKEL.